Nov. 16, 1954 J. H. PORTER ET AL 2,694,599

THREE WAY DUMP TRUCK LATCH CONSTRUCTION

Filed May 16, 1950 9 Sheets-Sheet 1

INVENTOR.
Jesse H Porter,
Ernest C. Pattison,
BY Victor J. Evans & Co.
ATTORNEYS

THREE WAY DUMP TRUCK LATCH CONSTRUCTION

Filed May 16, 1950 9 Sheets-Sheet 2

INVENTOR.
Jesse H. Porter,
Ernest C. Pattison,
BY Victor J. Evans & Co.
ATTORNEYS

THREE WAY DUMP TRUCK LATCH CONSTRUCTION

Filed May 16, 1950 9 Sheets-Sheet 3

INVENTOR
Jesse H. Porter,
Ernest C. Pattison,
BY Victor J. Evans & Co.
ATTORNEYS INVENTOR.
Jesse H. Porter,
Ernest C. Pattison,
BY Victor J. Evans & Co.
ATTORNEYS Nov. 16, 1954 J. H. PORTER ET AL 2,694,599

THREE WAY DUMP TRUCK LATCH CONSTRUCTION

Filed May 16, 1950 9 Sheets-Sheet 5

INVENTOR.

Jesse H. Porter,

Ernest C. Pattison,

BY Victor J. Evans & Co.

ATTORNEYS

INVENTOR.
Jesse H. Porter,
Ernest C. Pattison,
BY Victor J. Evans & Co.
ATTORNEYS INVENTOR.
Jesse H. Porter,
Ernest C. Pattison,
BY Victor J. Evans & Co.
ATTORNEYS Nov. 16, 1954 J. H. PORTER ET AL 2,694,599
THREE WAY DUMP TRUCK LATCH CONSTRUCTION
Filed May 16, 1950 9 Sheets-Sheet 8
Fig. 15.
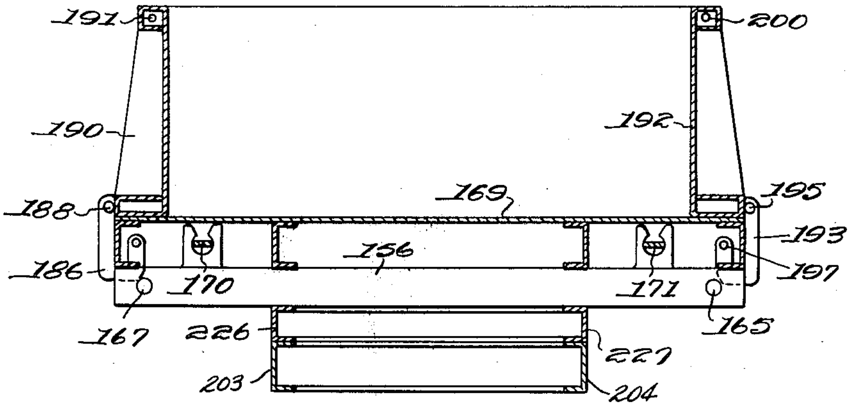
Fig. 16.
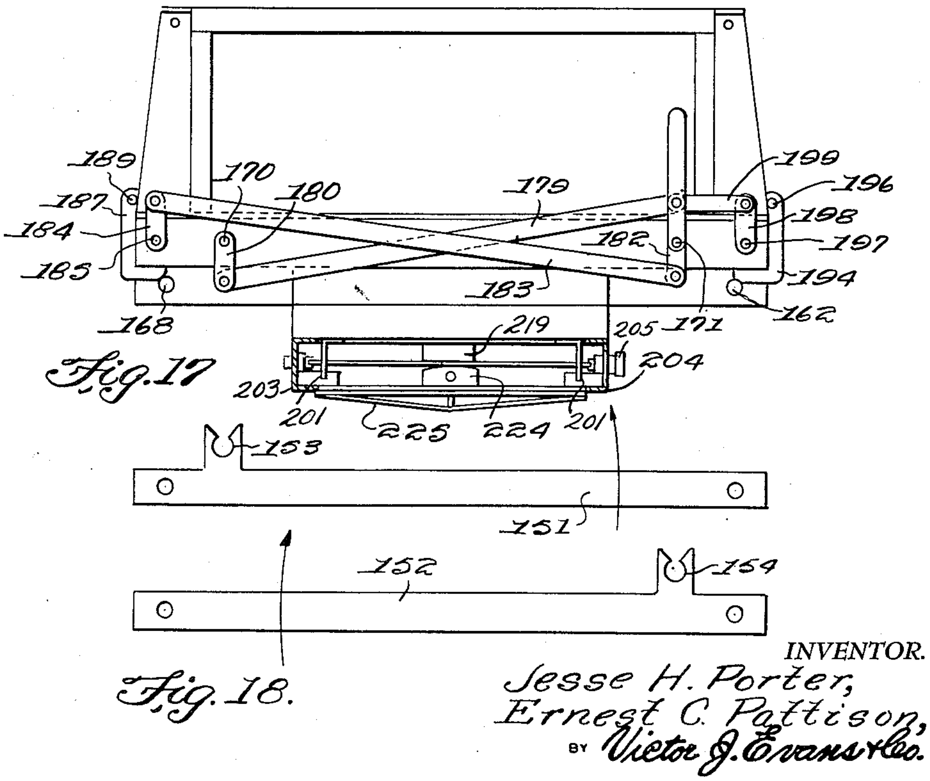
Fig. 16, Fig. 17, Fig. 18.
INVENTOR.
Jesse H. Porter,
Ernest C. Pattison,
BY Victor J. Evans & Co.
ATTORNEYS Nov. 16, 1954 J. H. PORTER ET AL 2,694,599

THREE WAY DUMP TRUCK LATCH CONSTRUCTION

Filed May 16, 1950 9 Sheets-Sheet 9

INVENTORS

JESSE H PORTER &

ERNEST C. PATTISON

BY Victor J. Evans & Co.

ATTORNEYS 2,694,599

THREE-WAY DUMP TRUCK LATCH CONSTRUCTION

Jesse H. Porter and Ernest C. Pattison, Lonaconing, Md.

Application May 16, 1950, Serial No. 162,366

2 Claims. (Cl. 298—19)

This invention relates to trucks and trailers particularly of the type commonly known as dump trucks, and in particular this invention relates to a dump truck body mounted on a chassis with a hydraulic cylinder pivotally mounted in the chassis and connected to the dump truck body and in which the dump truck body is pivotally connected to the chassis at each side and also at the rear end and also in which latching elements are provided wherein one of the latches may be released so that the pressure of the hydraulic cylinder will swing the truck body to dumping positions at either side or at the rear.

The purpose of this invention is to provide means for incorporating readily releasable latches in dumping truck bodies whereby a common elevating element may actuate the body to dump on either side or at the rear.

Various types of mounting elements have been provided for holding dumping truck bodies on chassis whereby the truck dumps on the sides or at the rear but it has been found difficult to incorporate the operating instrumentalities for trucks that dump from both of the sides and also from the rear without increasing the height of the chassis to such an extent that the trucks are generally considered top heavy. With this thought in mind this invention contemplates a three-way dump truck in which the supporting and operating instrumentalities dove-tail into a common frame with hinge elements at the sides and rear and with latch elements extended downwardly from the coacting parts.

It has been found difficult in dump trucks of this type to incorporate means for automatically releasing and locking gates or doors at the sides and rear end and to accomplish this purpose applicant provides shoes extended downwardly from the floor of the body and positioned to engage the piston rod of a cylinder as the body approaches the dumping position.

The object of this invention is, therefore, to provide improvements in the chassis of three-way dump trucks wherein the dumping elements dove-tail to form a single layer of supporting and operating elements and wherein the truck body may be actuated to dump to either side or to the rear end by releasing corresponding latching elements.

Another object of the invention is to provide supporting and operating means for a three-way dump truck that may be incorporated in the structure of a truck or trailer now in use.

A further object of the invention is to provide an improved three-way dump truck with latching elements corresponding with each dumping position which is of a simple and economical construction.

With these and other objects and advantages in view the invention embodies a chassis for a dump truck including transversely and longitudinally extended beams with pivotal mounting means at the sides and rear, with latch elements at the sides and forward ends, with doors and latching means therefor and with a hydraulic lift cylinder.

Other features and advantages of the invention will appear from the following description taken in connection with the drawings wherein:

Figure 12 is a view illustrating a modification wherein the three-way dump truck body is incorporated in a trailer.

Figure 15 is a cross section through the truck body illustrated in Figures 13 and 14.

Figure 16 is a cross section through the chassis of the truck body shown in Figures 13 and 14, looking toward the forward end of the dumping body and showing the latch actuating levers mounted thereon.

Figure 17 is a detail showing one of the latch bars of the truck shown in Figures 15 and 16.

Figure 18 is a smiilar view showing a latch bar for the opposite side of the truck body.

Figure 1:
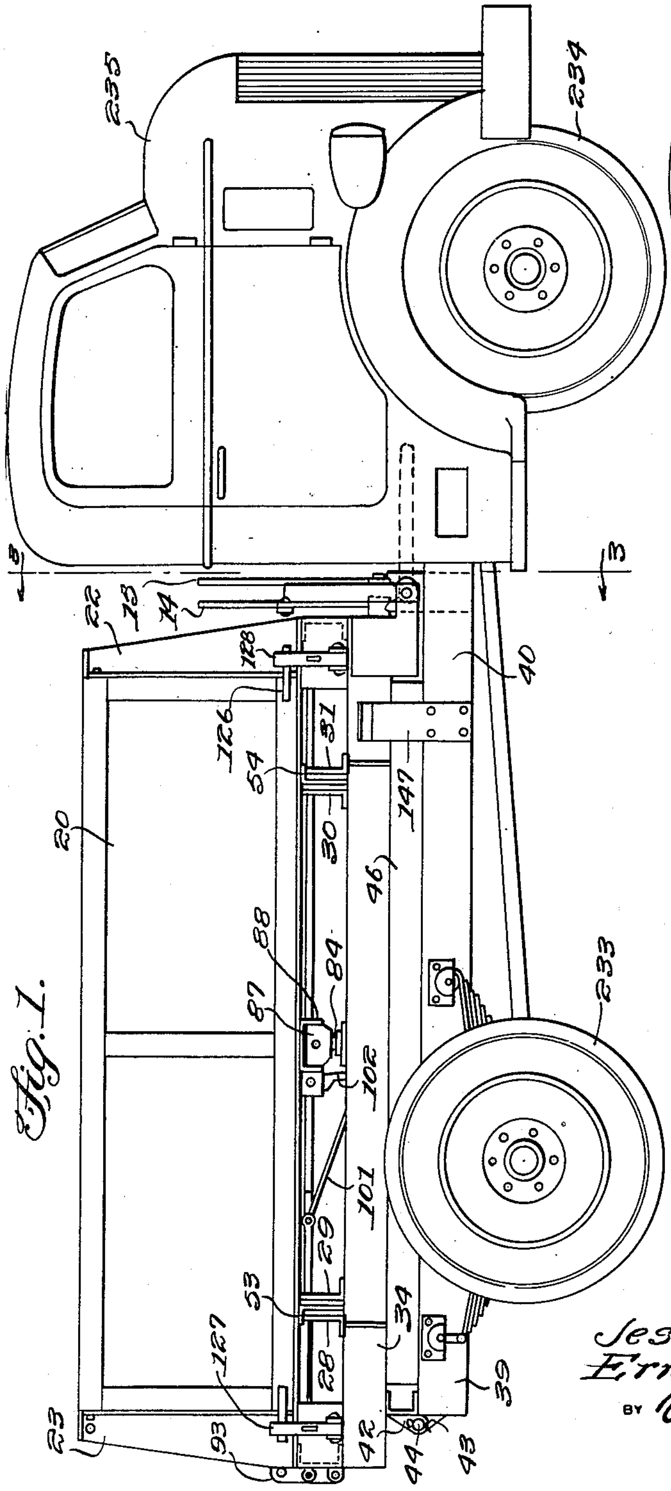
Figure 1 is a side elevational view of the three-way dump truck.
Figure 1A:
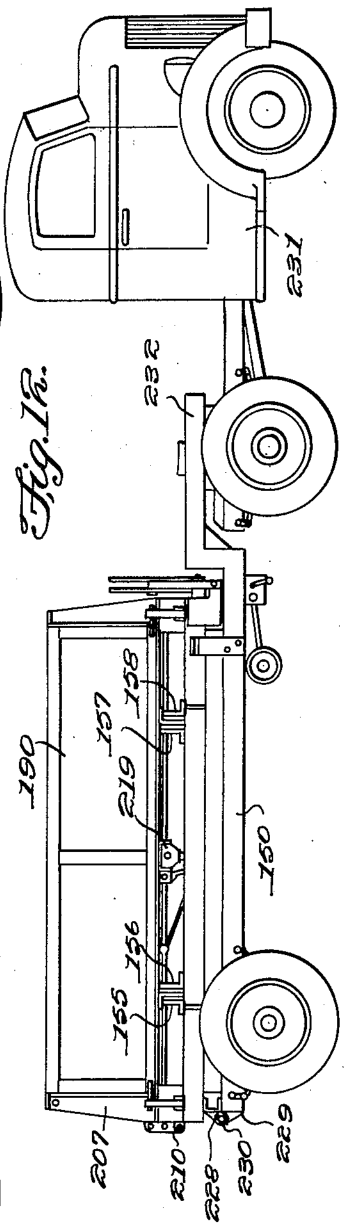
Figure 2:
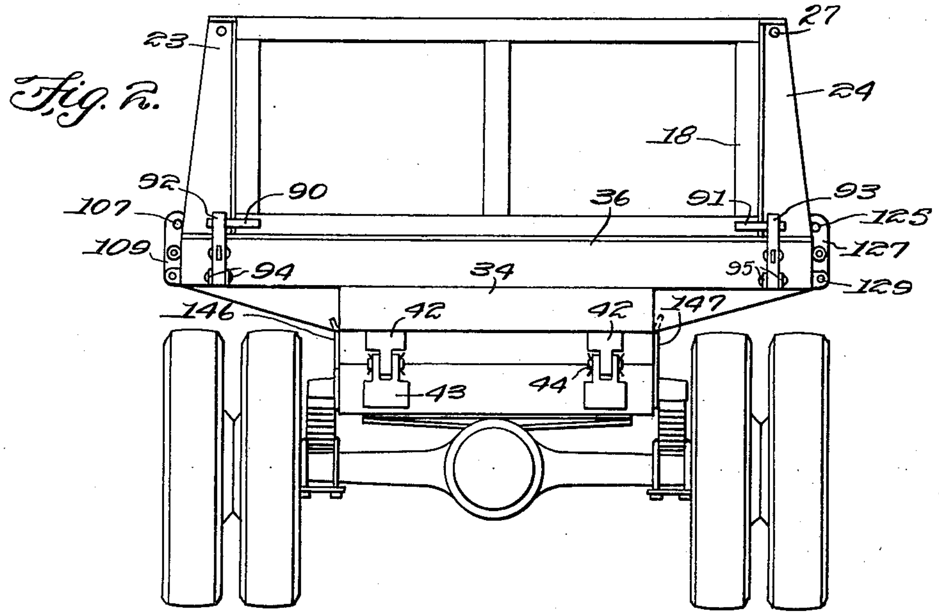
Figure 2 is an end view of the truck looking toward the rear thereof.

Referring now to the drawings wherein like reference characters denote corresponding parts the improved three-way dumping truck of this invention includes a truck body having a floor 10, a hydraulic cylinder 11, latch bars 12 and 13, hand levers 14 and 15 for actuating latch elements for dumping at the sides and a hand lever 16 for actuating the latch elements for dumping at the rear.

The truck body is formed with a stationary head 17 at the forward end, a tail gate 18, and gates 19 and 20 at the sides. The body is provided with posts 21 and 22 at the forward end and 23 and 24 at the rear and the tail gate 18 is pivotally mounted between the posts 23 and 24 by a shaft 25 which extends through the upper end of the tail gate and is pivotally mounted in the adjoining surfaces of the posts. The gate 19 is pivotally mounted by a shaft 26 between the posts 21 and 23 and the gate 20 is pivotally mounted with a shaft 27 between the posts 22 and 24.

Figure 8:
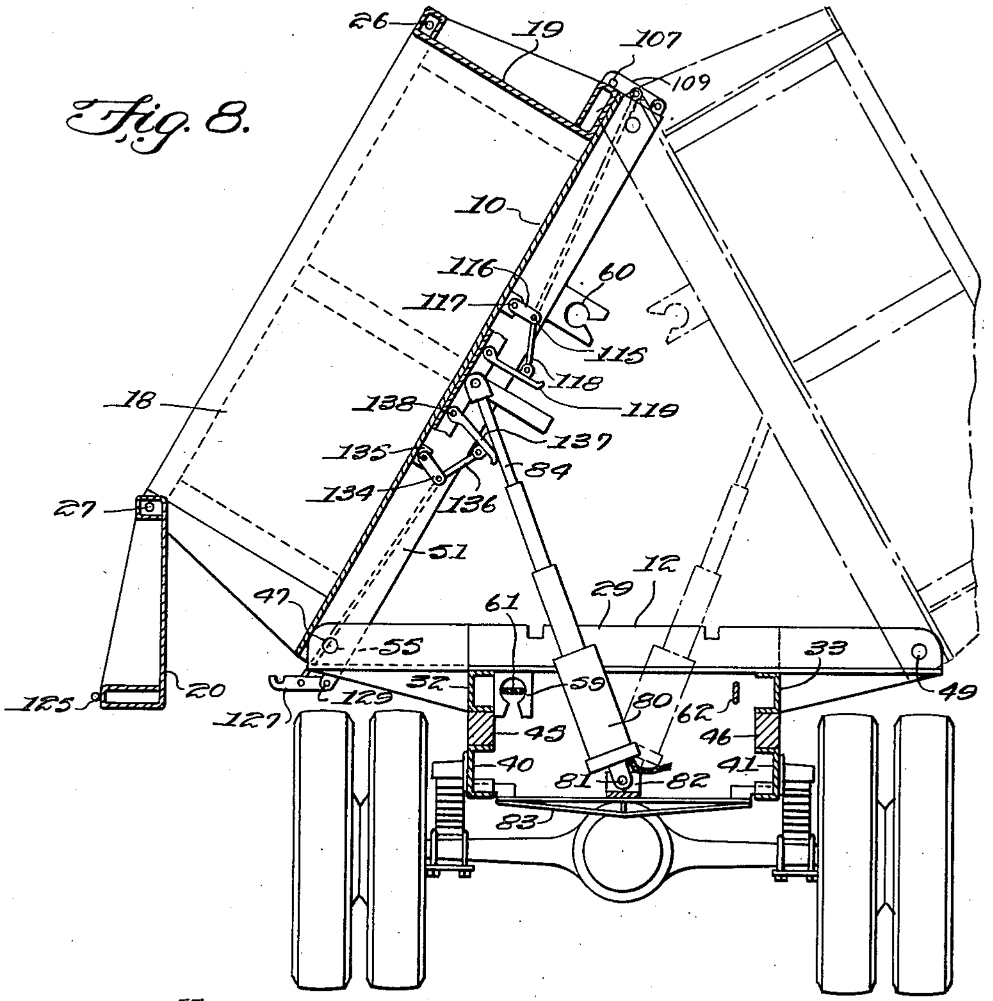
Figure 8 is a cross section through the truck taken on line 8—8 of Figure 4 and showing the body in the position of dumping toward the left.

The floor 10 of the truck body is supported by transversely disposed angle irons 28 and 29 at the rear and 30 and 31 at the forward end and the transversely disposed angle irons are supported on longitudinally disposed channels 32 and 33, as shown in Figure 8. The ends of the channels 32 and 33 are mounted in a transverse channel 34 at the rear and a similar channel 35 at the forward end. The rear end of the floor 10 is supported by channel 36 at the rear and the forward end is held by a channel 37.

The channels 32 and 33 are carried by a transverse channel 38 which is hinged to a channel 39 extended across the rear ends of channels 40 and 41 by hinge elements 42 and 43 and the hinge elements are pivotally connected by a hinge bolt 44. The intermediate parts of the channels 32 and 33 rest upon wood beams 45 and 46 which are positioned on the channels 40 and 41, as shown in Figure 8.

Figures 4, 5:
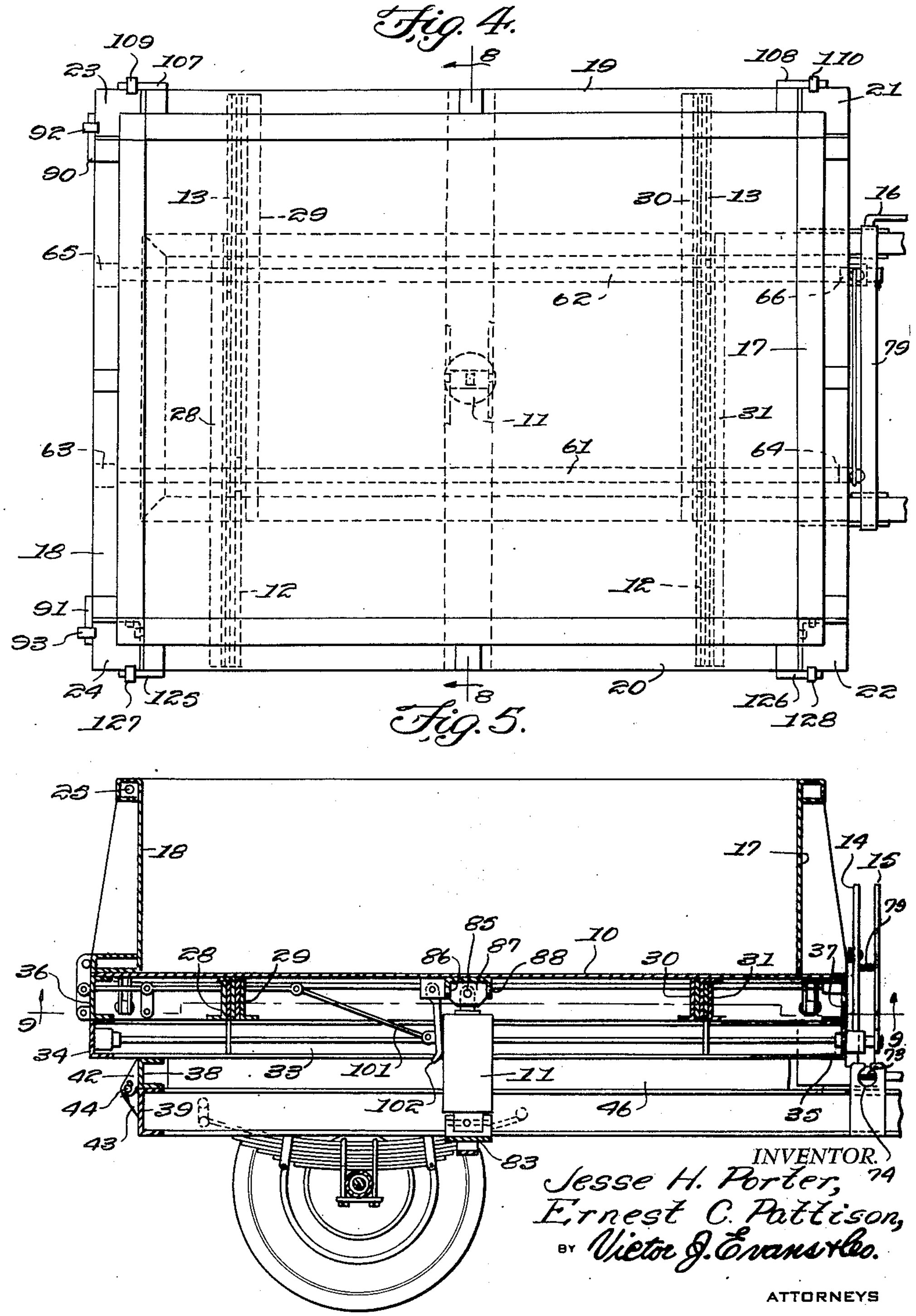
Figure 4 is a plan view of the truck body.
Figure 5 is a longitudinal section through the truck taken on line 5—5 of Figure 3.

The latch bars 12 are positioned between the angle irons 28 and 29 and 30 and 31 and the ends of the bars at one side are pivotally mounted on pins 47 and 48 and the bars 13, which are also positioned between the angle irons 28 and 39 and 30 and 31 are pivotally mounted at the opposite sides by pins 49 and 50. Dividing plates 51 and 52 are positioned between the latch bars and, as illustrated in Figure 5 the dividing bars are attached to the under surface of the floor 10 and the angle irons 28 and 29 and 30 and 31 are attached to the longitudinal channels 32 and 33. The dividing plate 51 is provided with a flange 53 by which it is attached to the under surface of the floor 10 and the bar 52 is provided with a flange 54 that secures the bar to the under surface of the floor.

Figure 19:
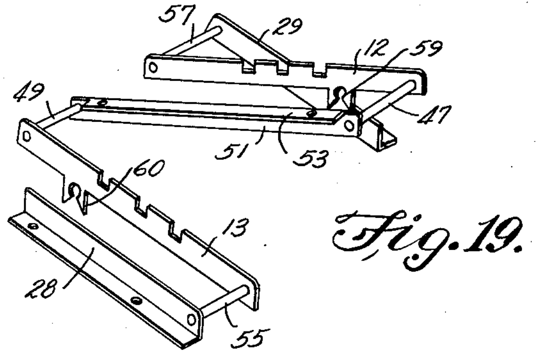
Figure 19 is a perspective view showing the positions of the latch bars and mounting elements with the body tilted to one side.
Figure 9:
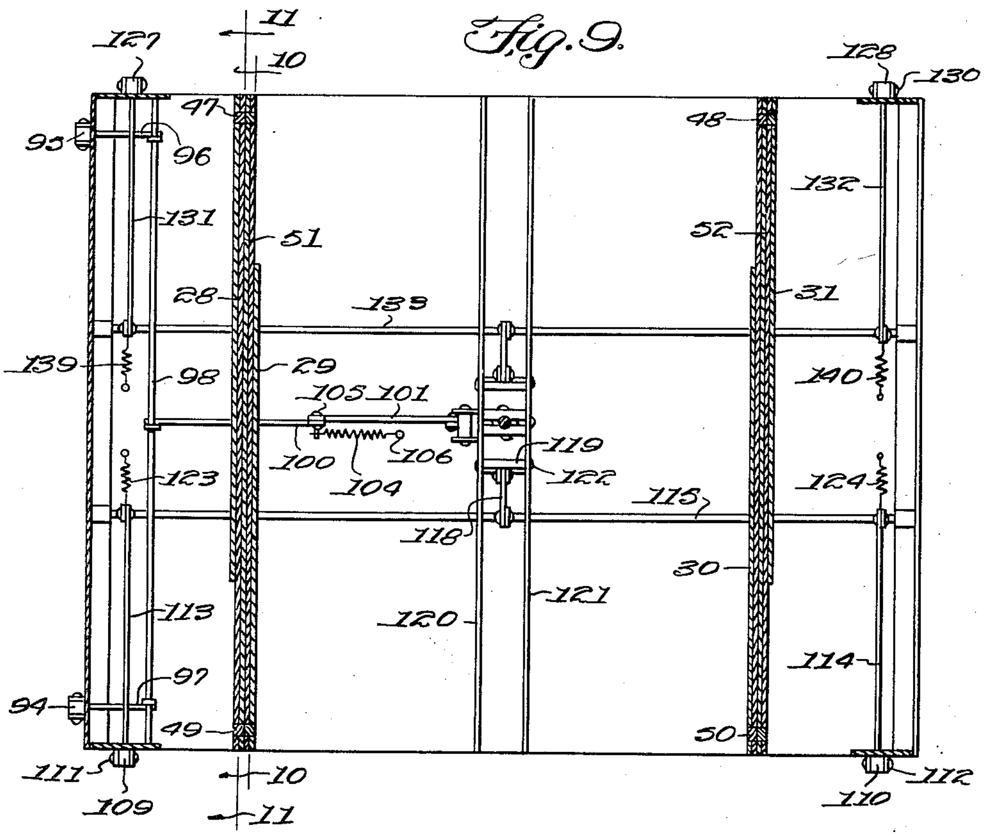
Figure 9 is a horizontal section through the truck body looking upwardly and taken on line 9—9 of Figure 5.
Figures 10, 11:
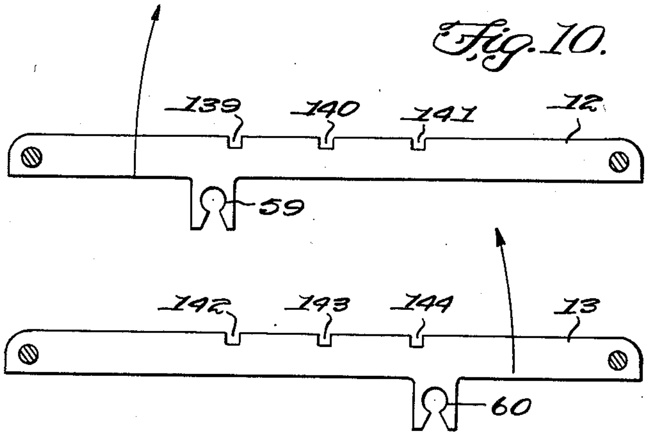
Figure 10 is a cross section taken on line 10—10 of Figure 9 illustrating the latch lever for releasing the truck body when it is desired to dump to the right of the truck with the truck in position shown in Figure 8.
Figure 11 is a similar section taken on line 11—11 of Figure 9 showing one of the latch bars for releasing the truck body for dumping in the opposite direction.
Figure 20:
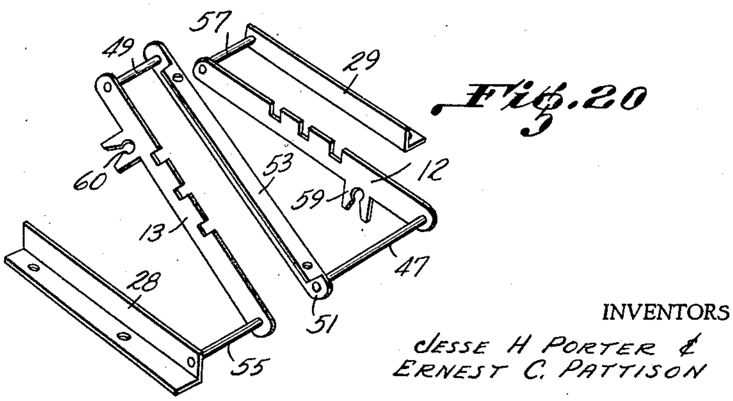
Figure 20 is a detail similar to that shown in Figure 19 showing the position of the latch bars, dividing plates and channels with the truck body dumped towards the opposite side of the truck.

With the bars 13, as illustrated in Figures 19 and 20, pivotally mounted on the chassis by pins 55 and 56 in the ends of the angle irons 28 and 31, on the left hand side of the chassis and pivotally connected, at the opposite sides by the pins 49 and 50 to the dividing bars 51 and 52, the right hand side of the truck is free to move upwardly, and with the latch bars 12 pivotally mounted on the chassis through the angle irons 29 and 30 by pins 57 and 58 at the right hand side of the chassis and the opposite ends pivotally connected to the dividing bars 51 and 52 by the pins 47 and 48 the left hand side of the body is free to move upwardly to the position shown in dotted lines in Figure 8.

The latch bars 12 are provided with sockets 59 and the bars 13, with sockets 60 and flat bars 61 and 62, which extend longitudinally of the chassis are positioned to extend through the sockets and with the bars 12 horizontally positioned, such as the position of the bar 61 in Figure 8 the latch bars are locked in the downward position.

Figure 3:
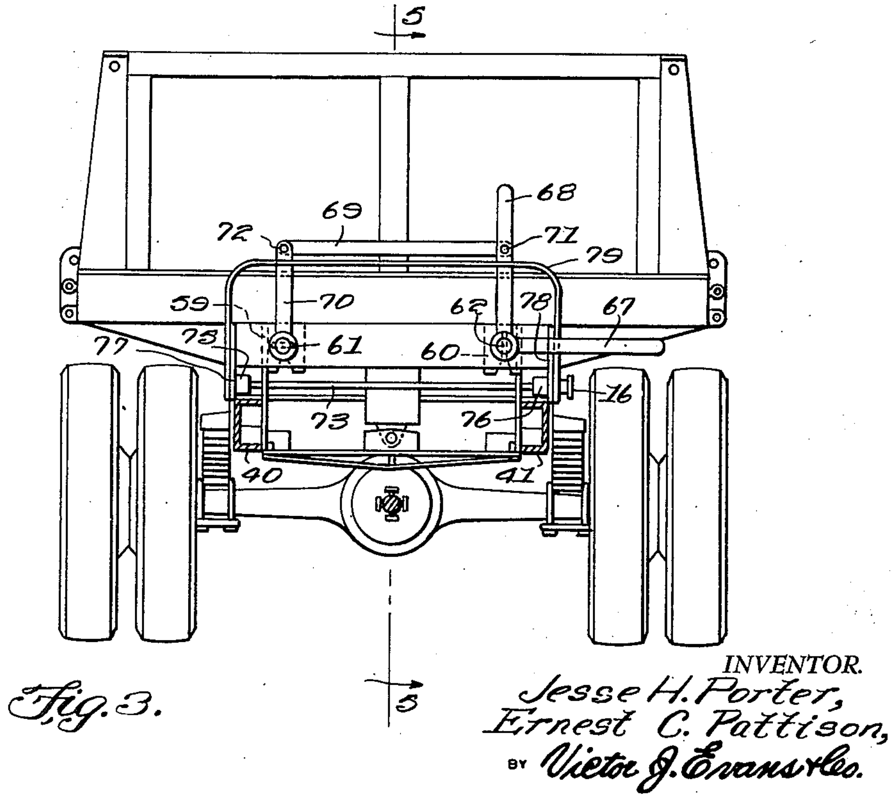
Figure 3 is a cross section through the truck taken on line 3—3 of Figure 1 showing the control levers in the position wherein the truck is adapted to dump toward the left hand side.

The bar 61 is journaled in bearings 63 and 64 in the channels 34 and 35 and the bar 62 is journaled in similar bearings 65 and 66. The bar 62 is actuated by a hand lever 67 that is mounted on the end thereof and the bar 61 is actuated by a hand lever 68 through a link 69 and an arm 70, as shown in Figure 3. The link 69 is pivotally connected to the lever 68 by a pin 71 at one end and the opposite end is pivotally connected to arm 70 by a pin 72. When the bar 62 turned through an angle of 90 degrees by the hand lever 67, as illustrated in Figures 3 and 8 the socket 60 is released and upward pressure on the under surface of the body causes the body to swing upwardly to the position shown in full lines in Figure 8 with the body pivoted on the pins 47 and 48, and by the same means the bar 61 may be rotated through an angle of 90 degrees by the hand lever 68 so that the opposite side of the body may be released to swing upwardly to the position shown in dotted lines in Figure 8. With the bars 61 and 62 horizontally positioned the latching elements are secured against side dumping and with the forward end of the body released by a bar 73 in a socket 74 see Figures 3 and 5 the forward end of the body is moved upwardly by pressure against the under surface thereof with the body swinging about the pins 44 in the hinge elements 42 and 43 wherein the body moves upwardly to the position shown in Figure 6. The bar 73 is journaled in bearings 75 and 76 that are carried by hangers 77 and 78 extended downwardly from the channel 35 on the forward end of the body and the bar 73 is rotated by the handle 16 extended from the end thereof.

The hand levers 67 and 68 are separated by and also supported by a U-shaped frame 79 extended upwardly from the hangers 77 and 78, as shown in Figure 3.

Figures 6, 7:
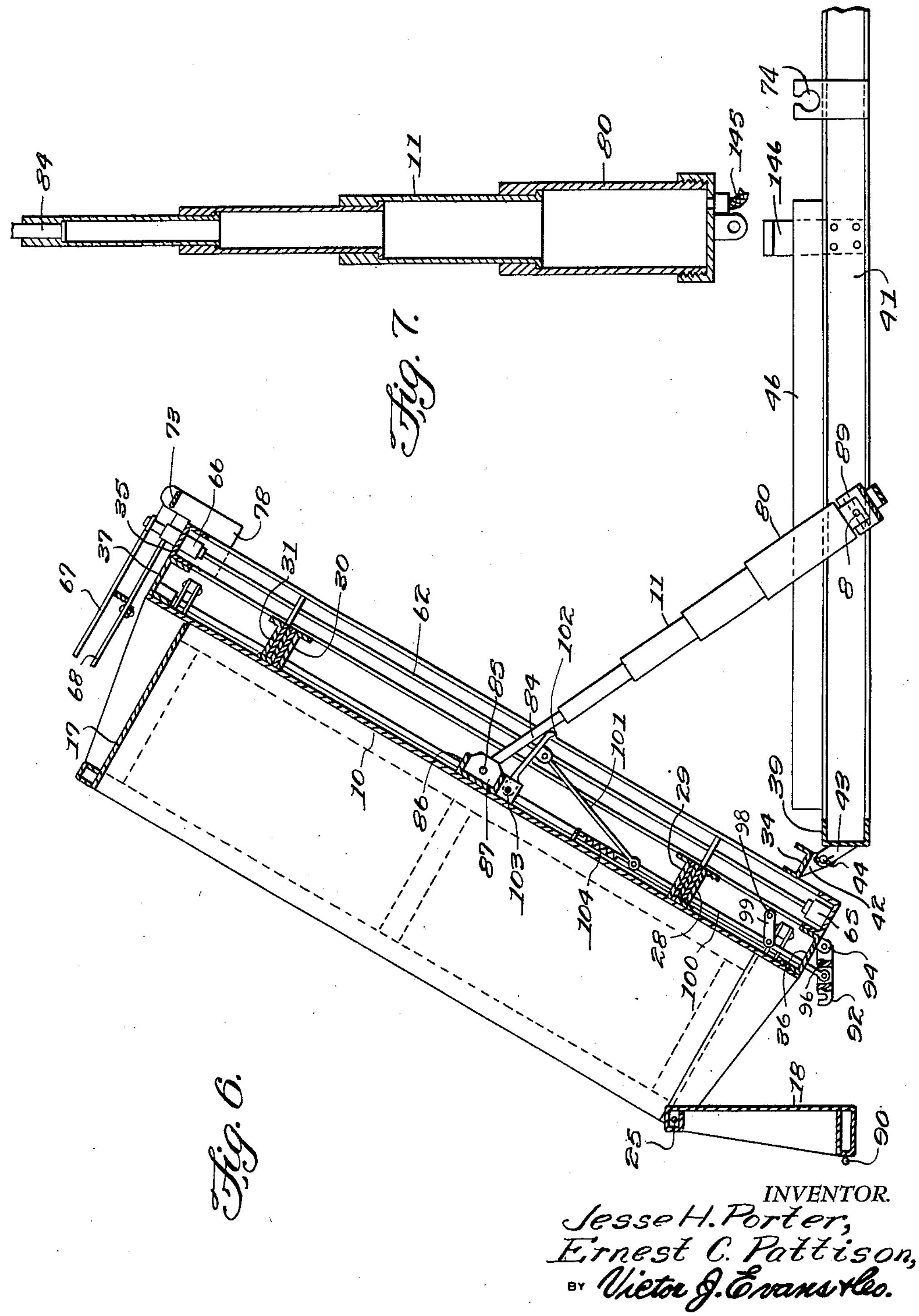
Figure 6 is a longitudinal section similar to that shown in Figure 5 illustrating the parts with the body of the truck in the position wherein the truck is dumped at the rear.
Figure 7 is a longitudinal section through the hydraulic lift cylinder.

The truck body is elevated by a telescoping hydraulic jack 11 having a base section 80 pivotally mounted by a pin 81 in a bearing 82 on a cross bar 83 suspended from the side channels 40 and 41 of the chassis and the connecting rod 84 at the upper end of the jack is pivotally connected to the under surface of the floor 10 of the truck body by a pin 85 in a channel shaped member 86. As illustrated in Figures 6 and 8 the pin 85 in the end of the connecting rod 84 connects the end of the connecting rod to a block 87 which is pivotally mounted in the channel 86 by pins 88, also as shown in Figure 5. By this means a universal joint is provided and, as illustrated in Figures 5 and 6 the pin 81 at the opposite end of the jack is aso mounted in the bearing block 82 by a pin 89, which also provides a universal connection.

The tail gate 18 is provided with latch bolts 90 and 91 which are positioned to be engaged by latches 92 and 93, respectively and the latches, which are pivotally mounted on the end of the channel 36 by bearings 94 and 95 are connected by links 96 and 97 to a cross bar 98 through an arm 99. The bar 98 is connected by the links 100 and 101 to a shoe 102 that is positioned to engage the connecting rod 84 of the jack 11 as the truck body reaches the dumping position. The shoe 102 is pivotally mounted on the under surface of the floor 10 by a pin 103 and the latches 92 and 93 are resiliently held in locking engagement with the latch bolts 94 and 95 by a spring 104, one end of which is attached to the pin 105 connecting the links 100 and 101, and the other end of which is connected to the under surface of the floor 10 by a projection 106.

The gate 19 on one side of the truck body is provided with latch bolts 107 and 108 that are engaged by latches 109 and 110, respectively and the latches 109 and 110 are pivotally mounted in bearings 111 and 112 and connected by links 113 and 114 to a longitudinally disposed bar 115. The bar 115 which is carried by an arm 116, pivotally mounted in a bearing 117, is connected by a link 118 to a shoe 119 which is pivotally mounted in flanges 120 and 121 by a pin 122. The link 113 is connected to a spring 123 that holds the latch 109 in the locking position as shown in Figure 8, and the link 114 is provided with a similar spring 124 which holds the latch 110 in the position of locking the gate 19 closed.

The gate 20 is provided with similar latch bolts 125 and 126 and these bolts are held in the position of holding the gate 20 closed by latches 127 and 128 in bearings 129 and 130.

The latches 127 and 128 are connected by links 131 and 132 to a cross bar 133 which is pivotally mounted by an arm 134 in a bearing 135 on the under side of the floor 10 and the arm 134 is connected by a link 136 to a shoe 137 that is pivotally mounted between the flanges 120 and 121 by a pin 138. Springs 139 and 140 are connected to the ends of the links 131 and 132 and to the under surface of the floor 10 for resiliently urging the latches 127 and 128 into locking engagement with the latch bolts 125 and 126.

With the parts arranged in this manner it will be noted, as illustrated in Figure 8 that as the track body approaches the position shown in full lines the shoe 137 is engaged by the connecting rod 84 whereby the connecting rod actuates the shoe to force the latches 126 and 127 outwardly so that the latch bolts 125 and 126 are released and the gate 20 will spring open. By the same means the connecting rod 84 engages the shoe 119 when the truck body swings to the opposite side.

The latch bars 12 are provided with notches 139, 140 and 141 and the bars 13 are provided with similar notches 142, 143 and 144 and the notches are positioned to clear the bars 100, 115 and 133.

The hydraulic jack 11 is provided with a supply connection 145 that may be connected to any suitable source for supplying fluid under pressure, and guides 146 and 147 are provided on the frame for receiving the beams 45 and 46 so as to guide the beams to positions on the channels 40 and 41.

In the modification illustrated in Figures 12 to 18 inclusive wherein the three-way dump truck body is mounted on a trailer 150 latch bars 151 and 152 having latching sockets 153 and 154 thereon, respectively are transversely positioned between the truck body and chassis with the latch bars at the rear mounted between channels 155 and 156 and channels 157 and 158 at the front, and a dividing bar 159 is positioned between the latch bars at the rear and a similar bar 160 is positioned between the bars at the front.

The latch bars 151 are pivotally mounted on the ends of the channels 155 and 157 by pins 161 and 162, respectively with the opposite ends thereof pivotally connected to the dividing bars 159 and 160 by pins 163 and 164, respectively and the latch bars 152 are pivotally connected to the opposite ends of the dividing bars 159 and 160 by pins 165 and 166, respectively, and to the channels 156 and 158 at the opposite ends by pins 167 and 168, respectively. By this means pressure on the under surface of the floor 169 of the truck body elevates the side of the body on which the latching bar is turned to the releasing position.

Figures 13, 14:
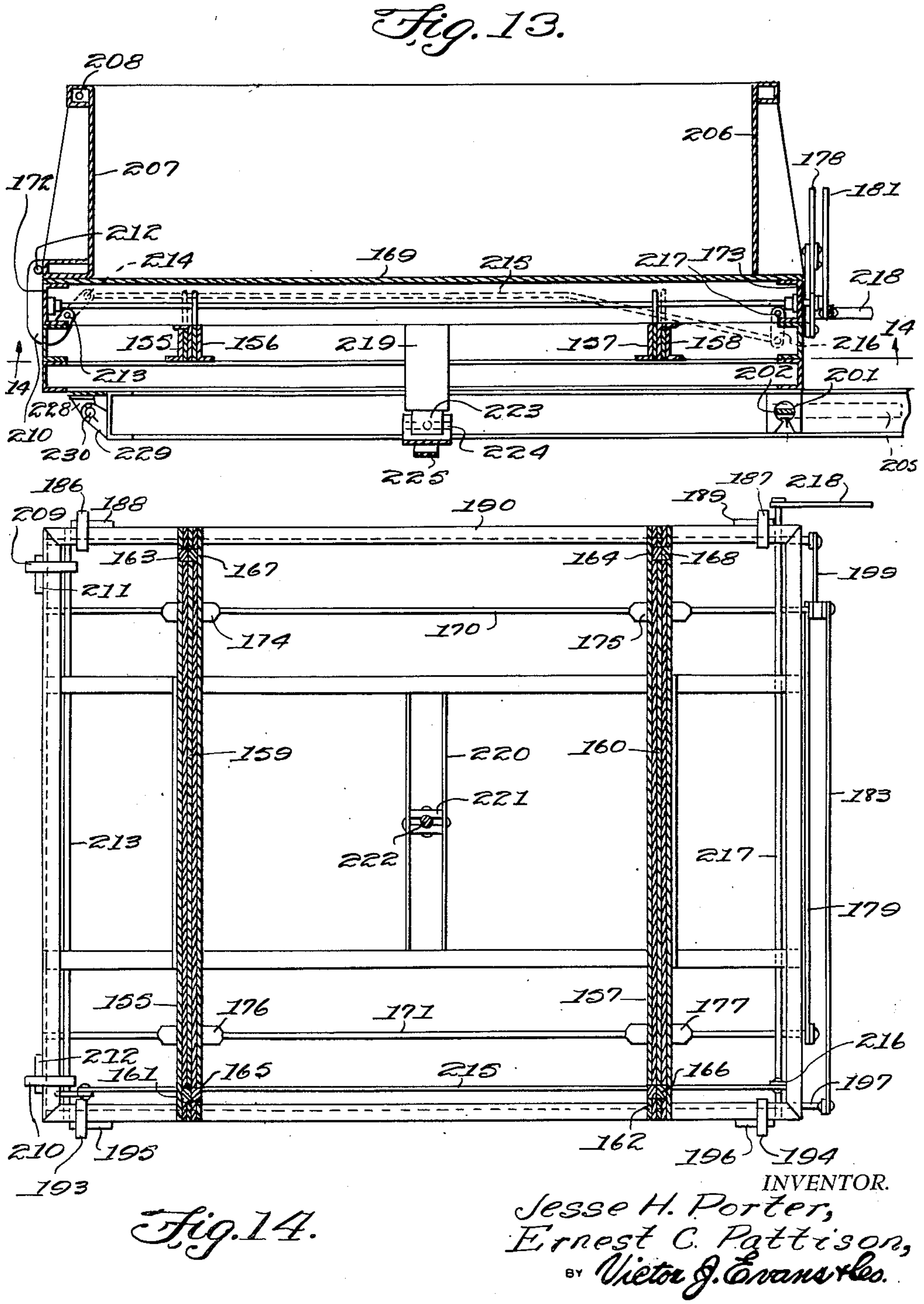
Figure 13 is a longitudinal section similar to that shown in Figure 5 and illustrating a modification wherein a dump truck body is mounted on an independent frame.
Figure 14 is a horizontal section taken on line 14—14 of Figure 13, looking upwardly toward the under side of the truck body shown in Figure 13.
Figure 21:
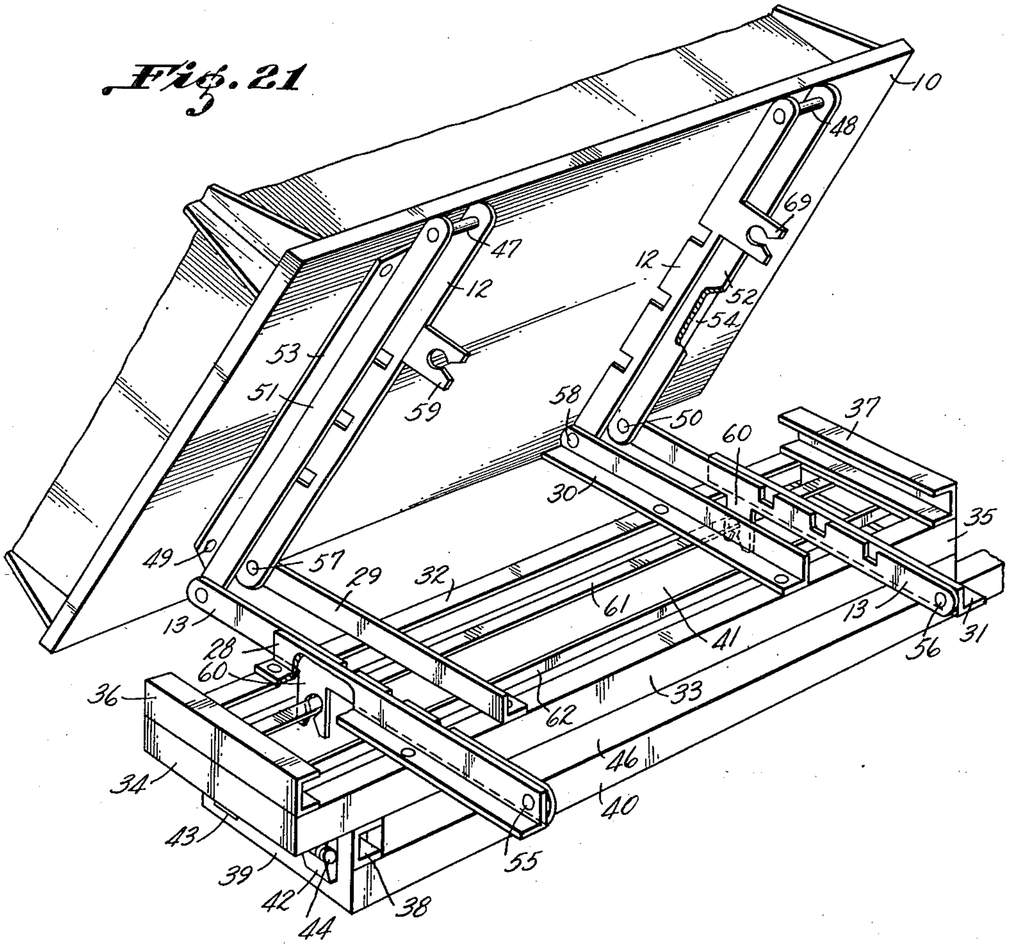
Figure 21 is a perspective view illustrating the jack knife elements of the truck body and showing the body tilted toward one side of the truck.

In the design illustrated in Figures 12 to 18 the latching bars 170 and 171 of the truck body are journaled in channels 172 and 173 at the ends of the truck body and, as illustrated in Figure 14 the latching bar 170 is provided with flat surfaces 174 and 175 that register with the sockets 153 of the latch bar 151. The latch bar 171 is also provided with flat sections 176 and 177 that register with the sockets 154 of the latch bar 152.

In this design the latching bar 170 is operated by a hand lever 178 which is connected to the bar 170 by a link 179 through an arm 180 on the end of the latching bar, and the latching bar 171 is actuated by a hand lever 181 which is mounted on the outer end of the bar.

In this design the hand lever 181 is provided with an extension 182 that is connected by a link 183 to an arm 184 on a shaft 185 and U-shape levers 186 and 187, mounted on the bar 185 provide locking means for engaging latch bolts 188 and 189 of a gate 190 on the corresponding side of the truck body. The gate is pivotally mounted on a shaft 191 between supporting posts at the front and rear ends of the truck body or floor 169. By this means as the hand lever 181 is turned to an angle of 90 degrees to release the sockets 154 of the latch bars 152 the levers 186 and 187 are actuated to release the lower edges of the door 190 so that with the latching bar 171 released from the chassis so that pressure on the under surface thereof elevates the side of the truck body on which the bar 171 is positioned, the gate on the opposite side opens.

By the same means the gate 192 on the opposite side of the truck body is released by the levers 193 and 194 which hold the latch bolts 195 and 196, respectively, and which are mounted on a bar 197 that is actuated by an arm 198 and a link 199 which is pivotally connected to the hand lever 178 which operates the latching bar 170 on the opposite side of the truck body. The gate 192 is pivotally mounted on a shaft 200.

In this design the forward end of the truck body is provided with latch sockets 201 that are positioned to receive a latch bar 202 that is pivotally mounted in channels 203 and 204 of the chassis and the bar 202 is actuated by a handle 205 on the outer end thereof.

The latch bar 202 is provided with flat sections similar to the latch bars 61 and 62 and 170 and 171 whereby with the flat sections horizontally disposed the bars in combination with the sockets 201 provide locking means for retaining the truck body in position upon the frame, however, upon turning the latch bar 202 through an angle of 90 degrees by the handle 205 the socket is free to pass upwardly over the latch bar similar to the releasing means of the sockets 153 and 154.

In this design the truck body 169 is provided with a head 206 and a tail gate 207 which is pivotally mounted on a shaft 208 and secured in the closed position by levers 209 and 210 that are provided with notches to receive latch bolts 211 and 212, respectively. The levers 209 and 210 are mounted on a bar 213 which is provided with an arm 214 and the arm 214 is connected by a rod 215 to an arm 216 on a bar 217 the outer end of which is provided with a handle 218. By this means the levers 209 and 210 may be actuated by the lever 218 to release the tail gate 207 when the forward end of the truck body is released by turning the latch bar 202 through an angle of 90 degrees.

The truck body of this design is elevated by a telescoping hydraulic cylinder 219, the upper end of which is mounted through a universal connection in a channel 220 with a bearing block 221 in which a connecting rod 222 of the telescoping cylinder or jack is pivotally mounted. The lower end of the cylinder or jack 219 is mounted through a universal connection including a block 223 and a bearing element 224 on a strut 225.

The transversely disposed channels 155 and 156, and 157 and 158 are mounted on longitudinally disposed channels 226 and 227 and the channels 226 and 227 are hinged to the chassis 150 of the trailer with hinged elements 228 and 229 and the hinge elements are pivotally connected by pins 230.

By this means the latching bar 202 at the forward end of the chassis is rotated to release the forward end of the truck body when it is desired to dump from the rear and the latching bars 170 and 171 are actuated to release the sides of the truck body from the sockets 153 and 154, respectively when it is desired to dump toward either side.

The chassis 150 of the dump truck as illustrated in Figures 12 to 18 may be attached to a tractor or truck body as indicated by the numeral 231 by a tongue 232, as shown in Figure 12 and the dumping body and chassis of the truck illustrated in Figures 1 to 11 is mounted on rear wheels 233 and front wheels 234 with a cab 235 positioned on the forward end of the chassis.

It will be understood that other modifications may be made in the design and arrangement of the parts without departing from the spirit of the invention.

What is claimed is:

1. In a dump truck, the combination which comprises a truck body having a chassis, a frame positioned on the chassis, means hinging the rear end of the frame to the corresponding end of the chassis, latch means releasably retaining the forward end of the frame on the chassis, a truck body positioned on the frame, a pair of spaced, transversely disposed divider plates projecting downwardly from the bottom of the truck body, vertical webs extending transversely of the frame at opposite sides of the divider plates, a latch bar extending transversely of the frame between each divider plate and the webs at its opposite sides, a pivotal connection between the end of each divider at one side of the body and the corresponding end of a latch bar at one side of the divider, a pivotal connection between the other end of each divider and the corresponding end of the latch bar at its other side, the remaining ends of the latch bars being pivoted to the adjacent webs, said dividing plates, webs and latch bars releasably hinging the sides of the truck body to the corresponding sides of the frame, latch means coacting with the latch bars for releasably retaining the sides of the truck body on the corresponding sides of the frame and positoned to coact with the hinging means, gates pivotally mounted on the sides and rear end of the body and having latch lugs coacting with latch means at the sides and forward end of the frame for retaining the gates in closed positions, means elevating the said truck body for dumping on either side or to the rear, and means responsive to operation of the elevating means for causing the gate latch means to release the gate latch lugs.

2. A three-way dump truck comprising a chassis, a truck body having a stationary head on the forward end positioned on the chassis, a frame positioned between the truck body and chassis, means hinging the frame to the rear of the chassis, a transverse latch bar journaled in the forward end of the frame, open sockets carried by the chassis and formed to releasably receive the latch bar, means actuating the latch bar to releasing position in the said sockets, spaced longitudinally disposed latching bars journaled in the frame, a pair of spaced, transversely disposed divider plates projecting downwardly from the bottom of the truck body, vertical webs extending transversely of the frame at opposite sides of the divider plates, a latch bar extending transversely of the frame between each divider plate and the webs at its opposite sides, a pivotal connection between the end of each divider at one side of the body and the corresponding end of a latch bar at one side of the divider, a pivotal connection between the other end of each divider and the corresponding end of the latch bar at its other side, the remaining ends of the latch bars being pivoted to the adjacent webs, said dividing plates, webs and latch bars releasably hinging the sides of the truck body to the corresponding sides of the frame, open sockets extended downwardly from the latch bars and positioned to receive the said longitudinally disposed latch bars of the frame for retaining the respective sides of the truck body on the frame, means actuating the said latching bars to release the sockets and latch bars from which the sockets extend, gates pivotally mounted on the sides and rear end of the truck body, latches locking the gates in the closed positions, a hydraulic jack positioned on the chassis and connected to a center point of the truck body for elevating the truck body, shoes mounted on the under surface of the truck body and positioned to be engaged by the said hydraulic jack, and means connecting the shoes to the latch means of the gates whereby a gate on the low side or rear end of the truck body is opened as the opposite side or end is elevated.

References Cited in the file of this patent

UNITED STATES PATENTS

| Number | Name | Date |
|---|---|---|
| 1,955,167 | Barrett | Apr. 17, 1934 |
| 2,032,840 | Flowers | Mar. 3, 1936 |
| 2,180,066 | Porter | Nov. 14, 1939 |

FOREIGN PATENTS

| Number | Country | Date |
|---|---|---|
| 447,110 | Germany | July 15, 1927 |